US006607814B2

(12) United States Patent
Pickett et al.

(10) Patent No.: US 6,607,814 B2
(45) Date of Patent: *Aug. 19, 2003

(54) WEATHERABLE MULTILAYER ARTICLES AND METHOD FOR THEIR PREPARATION

(75) Inventors: James Edward Pickett, Schenectady, NY (US); Joseph Anthony Suriano, Clifton Park, NY (US); Steven Thomas Rice, Scotia, NY (US); Xiangyang Li, Mt. Vernon, IN (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/908,387

(22) Filed: Jul. 18, 2001

(65) Prior Publication Data

US 2001/0055671 A1 Dec. 27, 2001

Related U.S. Application Data

(63) Continuation-in-part of application No. 09/368,705, filed on Aug. 5, 1999.
(60) Provisional application No. 60/128,339, filed on Apr. 8, 1999.

(51) Int. Cl.$^7$ .......................... C08L 69/00; B32B 27/36; B32B 27/08
(52) U.S. Cl. .................... 428/212; 428/423.7; 428/412; 525/439; 528/176; 528/196; 528/198
(58) Field of Search ................................ 428/195, 212, 428/412; 525/439; 528/176, 196, 198

(56) References Cited

U.S. PATENT DOCUMENTS

| | | | |
|---|---|---|---|
| 3,169,121 A | 2/1965 | Goldberg | |
| 3,207,814 A | 9/1965 | Goldberg | |
| 3,444,129 A | * 5/1969 | Young et al. | ................. 260/47 |
| 3,460,961 A | 8/1969 | Young, Jr. et al. | ......... 117/33.3 |
| 3,492,261 A | 1/1970 | Young, Jr. et al. | ......... 260/30.4 |
| 3,503,779 A | 3/1970 | Young, Jr. et al. | ......... 117/33.3 |
| 3,506,470 A | 4/1970 | Young, Jr. et al. | ......... 117/33.3 |
| 4,127,560 A | 11/1978 | Kramer | |
| 4,334,053 A | 6/1982 | Freitag et al. | |
| 4,414,230 A | 11/1983 | Hanabata et al. | |
| 4,495,325 A | 1/1985 | DeBergalis et al. | |
| 4,503,121 A | 3/1985 | Robeson et al. | |
| 4,576,842 A | 3/1986 | Hartsing et al. | |
| 4,643,937 A | 2/1987 | Dickinson et al. | |
| 4,931,364 A | 6/1990 | Dickinson | |
| 4,992,322 A | * 2/1991 | Curry et al. | ................. 428/215 |
| 5,030,505 A | 7/1991 | Dickinson | |
| 5,064,704 A | 11/1991 | Stewart | |
| 5,318,850 A | 6/1994 | Pickett et al. | |
| 5,321,114 A | 6/1994 | Fontana et al. | |
| 5,510,182 A | 4/1996 | Fontana et al. | |
| 5,552,463 A | 9/1996 | Akkapeddi et al. | |
| 5,846,659 A | 12/1998 | Löwer et al. | |
| 5,916,997 A | * 6/1999 | Webb et al. | ................. 528/194 |
| 6,087,007 A | 7/2000 | Fujii et al. | |
| 6,136,441 A | 10/2000 | MacGregor et al. | |
| 6,143,839 A | * 11/2000 | Webb et al. | ................. 525/439 |
| 6,228,910 B1 | 5/2001 | Shakhnovich | ................. 524/88 |
| 6,245,118 B1 | 6/2001 | Shakhnovich | ................. 8/506 |
| 6,265,522 B1 | 7/2001 | Brunelle et al. | |
| 6,291,589 B1 | 9/2001 | Brunelle et al. | |
| 6,294,647 B1 | 9/2001 | Brunelle et al. | |
| 6,306,507 B1 | 10/2001 | Brunelle et al. | |
| 6,410,620 B2 | 6/2002 | Shakhnovich | ................. 524/89 |
| 6,414,058 B2 | 7/2002 | Shakhnovich | ................. 524/89 |
| 6,417,253 B1 | 7/2002 | Shakhnovich | ................. 524/86 |

FOREIGN PATENT DOCUMENTS

| | | |
|---|---|---|
| EP | 0733 470 | 9/1996 |
| JP | 199841 | 8/1989 |
| JP | 1-201326 | 8/1989 |
| JP | 6-122756 | 5/1994 |
| WO | WO 00/26275 | 5/2000 |

OTHER PUBLICATIONS

William M. Eareckson, III, Journal of Polymer Science, "Interfacial Polycondensation. X. Polyphenyl Esters*", vol. XL, pp. 399–406, 1959. * Presented at the Symposium on Polyethers and Condensation Polymers at the 134$^{th}$ Meeting of the American Chemical Society, Chicago, Ill., Sep., 1958.
Application Ser. No. 09/908,396, filed Jul. 18, 2001.
Journal of Polymer Science: Part A–1, vol. 9,3263–3299 (1971), Transparent Ultraviolet–Barrier Coatings, Cohen, SM, et al.

* cited by examiner

Primary Examiner—Cynthia H. Kelly
Assistant Examiner—B. Shewareged
(74) Attorney, Agent, or Firm—Noreen C. Johnson; Christian G. Cabou

(57) ABSTRACT

Substantially solvent-free multilayer articles characterized by excellent color retention and gloss retention, solvent resistance and recyclability comprise a substrate layer comprising a first material selected from the group consisting of a metal, ceramic, glass, a cellulosic material, a thermoset resin, and a thermoplastic resin, and a resinous coating layer which comprises at least one auxiliary color stabilizer additive and an arylate polymer comprising ester structural units derived from a resorcinol or alkylresorcinol isophthalate-terephthalate. An intermediate layer may also be present.

69 Claims, No Drawings

WEATHERABLE MULTILAYER ARTICLES AND METHOD FOR THEIR PREPARATION

CROSS-REFERENCE TO RELATED APPLICATION

This application is a continuation-in-part of copending U.S. application Ser. No. 09/368,705, filed Aug. 5, 1999, which claims the benefit of U.S. Provisional Application Ser. No. 60/128,339, filed Apr. 8, 1999, and which applications are incorporated herein by reference.

BACKGROUND OF THE INVENTION

This invention relates to weatherable multilayer resinous articles and their preparation. More particularly, it relates to articles in sheet form having a protective arylate polymer coating.

Various polymeric articles have a problem of long term color instability. This causes yellowing of the polymer, detracting from its transparency and attractiveness. Loss of gloss can also be an undesirable long term phenomenon.

Yellowing of polymers is often caused by the action of ultraviolet radiation, which is why such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature. Such levels may be inadequate to afford sufficient protection. Another problem of concern with polymers such as aromatic polycarbonates and addition polymers of alkenylaromatic compounds such as styrene is susceptibility to attack by organic liquids.

One way of protecting a resinous article against photoyellowing and loss of gloss is to apply a coating of a weatherable second polymer, the term "weatherable" as used herein signifying resistance to such phenomena. Weatherable polymers suitable for this purpose include resorcinol isophthalate/terephthalate copolyarylates. This is the subject of Cohen et al., *J. Poly. Sci., Part A*-1, 9, 3263–3299 (1971), and certain related U.S. patents of Monsanto Company including U.S. Pat. Nos. 3,444,129, 3,460,961, 3,492,261 and 3,503,779.

The only method disclosed therein for the application of the weatherable polymer, however, is by solution coating followed by evaporation of the solvent. This method has numerous deficiencies, some of which are mentioned in the Cohen et al. paper at page 3267: namely, the necessity to use high priced and toxic solvents, the inherently low concentration of the arylate polymer in the solvent and the tendency of the solutions to gel. Accordingly, the described copolyarylates were considered "unacceptable coating candidates".

Other serious deficiencies of solvent coating have been discovered since the publication of the Cohen et al. paper and related patents. A principal one is an inherent property of the use of a solvent: it cannot possibly be completely removed by any procedure occurring at a level below the glass transition temperature of the substrate, which is impractical since it causes physical distortion.

Therefore, the solvent remains present in sufficient quantities to adversely affect the properties of the substrate polymer. This can occur by way of volatilization of the remaining traces of solvent during subsequent heat treatment such as thermoforming, lamination, in-mold decoration or baking in a paint oven. On a cosmetic level, the results can include blistering, bubbling, cracking and void formations within the substrate and coating, degrading the appearance of the resulting article. Other adverse results can be degradation of physical properties by crazing, cracking and embrittlement of the substrate polymer.

Since the publication of the Cohen et al. paper, the industry has further recognized the desirability of recycling resinous articles by regrinding, to minimize the deposition of non-biodegradable waste in landfills. Many multilayer resinous articles cannot be recycled, since the substrate and the coating are often incompatible with each other and the recycle operation, which includes conversion to a blend of the two polymers, produces a material with inferior physical properties.

Japanese Kokai 1/199,841 discloses articles having a substrate layer comprising at least 90 mole percent poly (ethylene terephthalate) and a gas barrier coating layer which is a polyester of resorcinol and isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding which are essentially performed entirely in the melt, thereby overcoming the aforementioned deficiencies of solution coating. However, the only types of articles disclosed are bottles, which are produced from a co-injection molded parison by subsequent blow molding. Larger articles intended for outdoor use, such as external automobile body parts, are not disclosed and no method for their production is suggested, nor are articles in which the substrate layer is anything other than poly(ethylene terephthalate).

It remains of interest, therefore, to develop a method for preparing weatherable, solvent resistant multilayer articles which are capable of use for such varied purposes as body parts for outdoor vehicles and devices such as automobiles, and which can be prepared without adverse solvent effects. It is further of interest to prepare articles which include only mutually compatible polymers, making them suitable for recycle.

SUMMARY OF THE INVENTION

The present invention provides multilayer resinous articles which are weatherable, solvent-free and resistant to solvent action by organic liquids. Said articles are also recyclable by reason of the compatibility of the discrete layers therein.

In one of its aspects, the invention includes multilayer articles comprising:
  a substrate layer comprising a first material and
  a coating layer thereon, said coating layer comprising a thermoplastic polyester different from said first material and comprising structural units derived from a 1,3-dihydroxybenzene organodicarboxylate,
  with the proviso that said coating layer and a 25-micron portion of said substrate layer nearest to said coating layer are substantially free from volatile organic compounds.

Included as part of this aspect are articles in which the coating layer consists of 1,3-dihydroxybenzene organodicarboxylate units, a maximum of 75% by weight, if any, of the substrate layer being poly(ethylene terephthalate). Also included are articles in which the coating layer comprises a block copolyestercarbonate, said substrate limitation not applying thereto.

Another aspect of the invention is a method for preparing a multilayer resinous article which comprises applying in the melt a thermoplastic coating layer to a layer comprising a second material, said coating layer comprising a polyester comprising structural units derived from a 1,3-dihydroxybenzene organodicarboxylate and the above-described substrate limitation existing correspondingly depending on the structure of the coating layer. Still another aspect is multilayer resinous articles prepared by the aforementioned method.

DETAILED DESCRIPTION

In the present context a multilayer article is one containing at least two layers. Multilayer articles of the invention include, but are not limited to, those which comprise a substrate layer and a coating layer thereon; those which comprise a substrate layer with a coating layer on each side of said substrate layer; and those which comprise a substrate layer and at least one coating layer with at least one interlayer between a substrate layer and a coating layer. Any interlayer may be transparent and/or may contain an additive, for example a colorant or decorative material such as metal flake. In some embodiment an interlayer may be an adhesive interlayer. If desired, an overlayer may be included over the coating layer, for example to provide abrasion or scratch resistance. The substrate layer, coating layer, and any interlayers or overcoating layers are in one embodiment in contiguous superposed contact with one another.

The first material comprising the substrate layer in the articles of this invention may be, subject to the proviso hereinafter with respect to polyesters, any material capable of receiving an adherent polymer coating. Suitable materials include metals, ceramics, glass, cellulosic materials and resins. The applicable resins include thermoset and, especially, thermoplastic polymer(s), whether addition or condensation prepared.

Metal articles exposed to UV-light may exhibit tarnishing and other detrimental phenomena. In one embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any thermally stable polymer coating layer.

Multilayer articles encompassed by the invention also include those comprising at least one glass layer. Typically any glass layer is a substrate layer, although multilayer articles comprising a polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color.

Multilayer articles encompassed by the invention also include those comprising at least one layer comprised of a cellulosic material. Cellulosic materials include wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Thermoset polymer substrates may include those derived from epoxies, cyanate esters, unsaturated polyesters, diallyl phthalate, acrylics, alkyds, phenol-formaldehyde (including novolacs and resoles), melamine-formaldehyde, urea-formaldehyde, bismaleimides, PMR resins, benzocyclobutanes, hydroxymethylfurans and isocyanates. In one embodiment of the invention the thermoset polymer substrate comprises a RIM material. The invention also encompasses multilayer articles comprising a filled thermoset substrate layer such as a sheet molding compound (SMC), suitable fillers being listed hereinafter.

Thermoplastic polymers include, but are not limited to, polycarbonates, particularly aromatic polycarbonates, polyacetals, polyarylates (other than those employed for a coating layer, as defined hereinafter), polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, polyesters, liquid crystalline polyesters, polyetheresters, polyetheramides, polyesteramides, and polyestercarbonates (other than those employed for a coating layer, as defined hereinafter). In some embodiments polycarbonates and polyesters are preferred. A substrate layer may additionally contain art-recognized additives including, but not limited to, colorants, pigments, dyes, impact modifiers, stabilizers, color stabilizers, heat stabilizers, UV screeners, UV absorbers, flame retardants, fillers, flow aids, ester interchange inhibitors, and mold release agents.

Suitable polycarbonates include homo- and copolycarbonates comprising structural units of the formula

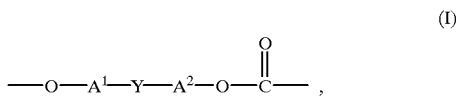

(I)

wherein each $A^1$ and $A^2$ is a monocyclic divalent aryl radical and Y is a bridging radical in which one or two carbon atoms separate $A^1$ and $A^2$. For example, $A^1$ and $A^2$ typically represent unsubstituted phenylene or substituted derivatives thereof. The bridging radical Y is most often a hydrocarbon group and particularly a saturated group such as methylene, cyclohexylidene or isopropylidene. In various embodiments polycarbonates are bisphenol A polycarbonates, in which each of $A^1$ and $A^2$ is p-phenylene and Y is isopropylidene. In one embodiment the weight average molecular weight of the initial polycarbonate composition ranges from about 5,000 to about 100,000; in another embodiment, from about 25,000 to about 65,000.

The polycarbonate may also be a copolyestercarbonate. Such polymers contain, in addition to the carbonate units of formula I, ester units typically containing $A^1$-Y-$A^2$ moieties linked to aromatic dicarboxylate groups such as isophthalate and/or terephthalate.

Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly (cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), Polyarylates that may be employed include those known in the art. They often comprise structural units derived from aromatic dihydroxy compounds and aromatic dicarboxylic acid compounds described herein as suitable for preparation of polycarbonates, polyesters, and copolyestercarbonates. Illustrative examples include polyarylates comprising terephthalate and/or isophthalate structural units in combination with bisphenol A. The polyetherimide resins useful with the present invention are generically known compounds whose preparation and properties are described in U.S. Pat. Nos. 3,803,085 and 3,905,942.

Suitable addition polymer substrates include homo- and copolymeric aliphatic olefin and functionalized olefin polymers (which are homopolymers and copolymers comprising structural units derived from aliphatic olefins or functionalized olefins or both), and their alloys or blends. Illustrative examples include, but are not limited to, polyethylene, polypropylene, thermoplastic polyolefin ("TPO"), ethylene-propylene copolymer, poly(vinyl chloride), poly(vinyl chloride-co-vinylidene chloride), poly(vinyl fluoride), poly (vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. In some embodiments the addition polymers are polystyrenes and especially the so-called "ABS" and "ASA" copolymers, which contain thermoplastic, non-elastomeric styrene-acrylonitrile side chains grafted on an elastomeric base polymer of butadiene and alkyl acrylate, respectively.

Blends of any of the foregoing polymers may also be employed. These include blends of thermoset polymers with thermoplastic polymers such as polyphenylene ether, polyphenylene sulfide, polysulfone, polyetherimide or polyester. The thermoplastic polymer is typically combined with thermoset monomer mixture before curing. Also included are blends of cellulosic materials and thermoset and/or thermoplastic polymers.

In some embodiments blends are thermoplastic blends. In various embodiments the blends are those of polyphenylene ether with polystyrene; and of polycarbonates with at least one of polyesters, ABS copolymers and ASA copolymers.

However, when the coating layer comprises an arylate polymer consisting of units of formula II or formulas II and III as defined hereinafter, no more than 75%, preferably no more than about 50% and most preferably no more than about 40% by weight of the substrate layer, if any, is PET; often, these maximum percentages apply generically to poly(alkylene terephthalates) including PET, PBT and PTT. In other words, any PET and often any poly(alkylene terephthalate) present in the substrate layer in such articles is in the form of a blend with another polymer, the latter comprising at least 25%, preferably at least about 50% and most preferably at least about 60% of said layer.

This limitation on the substrate does not apply when the coating layer is a block copolyestercarbonate comprising structural units of formula IV as also defined hereinafter. However, the same substrate limitation may be preferred in some embodiments.

In various embodiments the thermoplastic polymers for the substrate layer may be polycarbonates, ABS copolymers, ASA copolymers and blends of polycarbonates with either polyesters, ABS copolymers or ASA copolymers. Other thermoplastic polymers may be present therein, but the above-described polymers or blends typically constitute the major proportion thereof. The substrate may also incorporate fillers such as silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic.

Also present in the articles of the invention is a coating layer comprising a thermoplastic polyester comprising structural units derived from a 1,3-dihydroxybenzene organodicarboxylate. Suitable polymers for this purpose, specifically arylate polymers, are disclosed in commonly owned U.S. Pat. No. 6,143,839. Arylate polymers having a glass transition temperature of at least about 80° C. and no crystalline melting temperature, i.e., those that are amorphous, are preferred in one embodiment.

The arylate polymer is typically a 1,3-dihydroxybenzene isophthalate/terephthalate comprising structural units of the formula

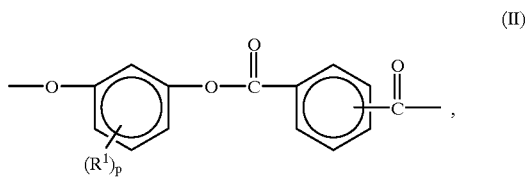

(II)

wherein each $R^1$ is a substituent, especially halo or $C_{1-12}$ alkyl, and p is 0–3, optionally in combination with structural units of the formula

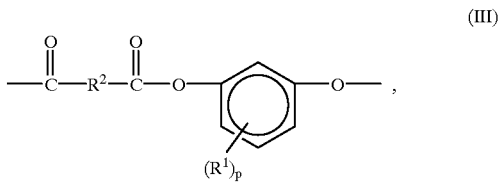

(III)

wherein $R^1$ and p are as previously defined and $R^2$ is a divalent $C_{4-12}$ aliphatic, alicyclic or mixed aliphatic-alicyclic radical.

It is within the scope of the invention for other acid groups, such as those derived from aliphatic dicarboxylic acids such as succinic acid, adipic acid or cyclohexane-1,4-dicarboxylic acid, or from other aromatic dicarboxylic acids such as 1,8-naphthalenedicarboxylic acid, to be present in the coating layer, typically in amounts no greater than about 30 mole percent. It is also within the scope of the invention for other polyesters which are miscible in at least some proportions with the arylate polymer to be present; these are exemplified by PBT, PET, PTT, and PCCD. Most often, however, the coating layer polymer consists of units of formula II, optionally in combination with units of formula III.

The units of formula II contain a resorcinol or substituted resorcinol moiety in which any $R^1$ groups may be $C_{1-4}$ alkyl; i.e., methyl, ethyl, propyl or butyl. In one embodiment $R^1$ groups are primary or secondary groups. In a particular embodiment $R^1$ groups are methyl. In some embodiments $R^1$ groups are resorcinol moieties, in which p is zero, although moieties in which p is 1 are also excellent with respect to the invention. Said resorcinol moieties are most often bound to isophthalate and/or terephthalate moieties.

In the optional soft block units of formula III, resorcinol or substituted resorcinol moieties are again present in ester-forming combination with $R^2$ which is a divalent $C_{4-12}$ aliphatic, alicyclic or mixed aliphatic-alicyclic radical. In some embodiments $R^2$ is aliphatic and especially $C_{8-12}$ straight chain aliphatic.

It is usually found that the arylate polymers most easily prepared, especially by interfacial methods, consist of units of formula II and especially combinations of resorcinol isophthalate and terephthalate units in a molar ratio in one embodiment in the range of about 0.25–4.0:1, in another embodiment in the range of about 0.4–2.5:1, in another embodiment in the range of about 0.67–1.5:1, and in still another embodiment in the range of about 0.9–1.1:1. When that is the case, the presence of soft block units of formula IV is usually unnecessary. If the ratio of units of formula III is outside this range, and especially when they are exclusively iso- or terephthalate, the presence of soft block units may be preferred to facilitate interfacial preparation. In one embodiment an arylate polymer containing soft block units is one consisting of resorcinol isophthalate and resorcinol sebacate units in a molar ratio between 8.5:1.5 and 9.5:0.5.

Arylate polymers useful in the articles of this invention may be prepared by conventional esterification reactions which may be conducted interfacially, in solution, in the melt or under solid state conditions, all of which are known in the art. Typical interfacial preparation conditions are described in commonly owned U.S. Pat. No. 5,916,997.

Also useful as arylate polymers according to the invention are the block copolyestercarbonates disclosed and claimed in copending, commonly owned application Ser. No. 09/416,529, filed Oct. 12, 1999, the disclosure of which is also incorporated by reference herein. They include block copolymers comprising moieties of the formula (IV):

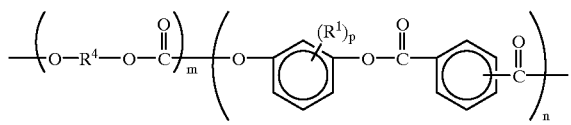

(IV)

wherein $R^1$ and p are as previously defined, each $R^4$ is independently a divalent organic radical, m is at least about 10 and n is at least about 4. Soft block moieties corresponding to formula III may also be present. The arylate blocks thus also contain an unsubstituted or substituted 1,3-dihydroxybenzene moiety. In one embodiment the moieties are resorcinol moieties, in which p is zero.

Said 1,3-dihydroxybenzene moieties are bound to aromatic dicarboxylic acid moieties which may be monocyclic, e.g., isophthalate or terephthalate, or polycyclic, e.g., naphthalenedicarboxylate. In various embodiments the aromatic dicarboxylic acid moieties are isophthalate and/or terephthalate. Either or both of said moieties may be present. For the most part, both are present in a molar ratio of isophthalate to terephthalate in one embodiment in the range of about 0.25–4.0:1, in another embodiment in the range of about 0.4–2.5:1, in another embodiment in the range of about 0.67–1.5:1, and in still another embodiment in the range of about 0.9–1.1:1.

Although both the substrate and the coating layers may thus be copolyestercarbonates, they are different from each other in molecular structure. More specifically, the coating layer will contain resorcinol-derived ester blocks while any ester blocks in the substrate layer will typically be derived from the same bisphenol(s) as the carbonate blocks.

The block copolyestercarbonates may be prepared by a two-step method in which a 1,3-dihydroxybenzene, which may be resorcinol or an alkyl- or haloresorcinol, is first contacted under aqueous alkaline reactive conditions with at least one aromatic dicarboxylic acid chloride, for example isophthaloyl chloride, terephthaloyl chloride or a mixture thereof. The alkaline conditions are typically provided by introduction of an alkali metal hydroxide, usually sodium hydroxide. A catalyst, most often a tertiary amine, tetraalkylammonium, tetraalkylphosphonium or hexaalkylguanidinium halide, is usually also present, as is an organic solvent, generally a water-immiscible solvent and in one embodiment a chlorinated aliphatic compound such as methylene chloride. Thus, the reaction is generally conducted in a 2-phase system.

In order to afford a hydroxy-terminated polyester intermediate, the molar ratio of resorcinol to acyl chlorides is in various embodiments greater than 1:1; e.g., in the range of about 1.01–1.90:1. Base may be present in a molar ratio to acyl halides of about 2–2.5:1. Catalyst is usually employed in the amount of about 0.1–10 mole percent based on combined acyl halides. Reaction temperatures are most often in the range of about 25–50° C.

Following the completion of polyester intermediate preparation, it is sometimes advantageous to acidify the aqueous phase of the two-phase system with a weak acid prior to phase separation. The organic phase, which contains the polyester intermediate, is then subjected to a second step which is the block copolyestercarbonate-forming reaction. It is also contemplated, however, to proceed to said second step without acidification or separation, and this is often possible without loss of yield or purity.

It is also possible to prepare the polyester intermediate entirely in an organic liquid, with the use of a base soluble in said liquid. Suitable bases for such use include tertiary amines such as triethylamine.

The dihydroxyaromatic compound employed in the second step typically has the formula HO—$R^4$—OH, wherein $R^4$ is as previously defined. In one embodiment the dihydroxyaromatic compound is bisphenol A. In one embodiment the carbonyl halide is phosgene. This reaction may be conducted according to art-recognized interfacial procedures (i.e., also in a 2-phase system), employing a suitable interfacial polymerization catalyst and an alkaline reagent (in one embodiment, sodium hydroxide), and optionally a branching agent such as 1,1,1-tris(4-hydroxyphenyl)-ethane and/or a chain termination agent such as phenol or p-cumylphenol. To suppress scrambling of the block copolymer, the pH is maintained at a relatively low level, typically in the range of about 5–9, for the initial part of the phosgenation reaction; it may be increased to about 10–13 during the latter part of said reaction.

Following completion of both reactions, the block copolyestercarbonate may be isolated by conventional procedures. These may include, for example, anti-solvent precipitation, drying and pelletization via extrusion. It is also contemplated to conduct the first step by other ester-forming methods, as illustrated by transesterification using aromatic diesters and a 1,3-dihydroxybenzene either in a solvent or in the melt.

Within the context of the present invention it should be understood that any coating layer comprising resorcinol arylate polyester chain members, for example a polyester or a block copolyestercarbonate, may also include polymer comprising o-hydroxybenzophenone or analogous chain members resulting, for example from Fries rearrangement of said resorcinol arylate chain members after exposure of said coating layer to visible and/or UV-light. Typically, a preponderance of any polymer comprising o-hydroxybenzophenone or analogous chain members, which are known to be active as UVA's, will be on that side or sides of said coating layer exposed to visible and/or UV-light and will overlay in a contiguous superposed layer or layers that polymer comprising unrearranged resorcinol arylate chain members. If it is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

It has been unexpectedly discovered that the presence of at least one stabilizer additive in a coating layer comprising resorcinol arylate polyester chain members may have a beneficial effect on color despite the fact that polymers comprising resorcinol arylate polyester chain members and their Fries rearrangement products themselves protect against photoyellowing. In the present context a stabilizer additive is an additive which provides one or both of lower initial color or additional resistance to weathering, as measured for example by initial yellowness index (YI), or by resistance to yellowing and change in color, when compared to a similar coating without at least one stabilizer additive. In a particular embodiment the stabilizer additive comprises at least one auxiliary color stabilizer additive. In another particular embodiment the stabilizer additive comprises at least one auxiliary light stabilizer additive. In one embodiment the presence of at least one auxiliary UV absorber as stabilizer additive provides additional resistance to weathering, for example as measured by initial yellowness index (YI), or resistance to yellowing and change in color, when compared to a similar coating without at least one auxiliary UV absorber. Since resorcinol arylate-comprising polymers generate UV absorber in situ, it is unexpected that the addition of auxiliary UV absorber would affect the amount of color or yellowness generated.

In various embodiments stabilizer additives include those known in the art. For example, illustrative UV absorbers include, but are not limited to, hydroxybenzophenones, hydroxybenzotriazoles, hydroxybenzotriazines, cyanoacrylates, oxanilides, and benzoxazinones. Illustrative UV absorbers also include nano-size inorganic materials such as titanium oxide, cerium oxide, and zinc oxide, all with particle size less than about 100 nanometers. Illustrative examples of stabilizer additives also include carbodiimides, such as bis-(2,6-diisopropylphenyl) carbodiimide and polycarbodiimides; hindered amine light stabilizers; hindered phenols; phosphites and phosphorous acid. Such stabilizer additives are known in the art and are disclosed in standard reference works such as "Plastics Additives Handbook", 5th edition, edited by H. Zweifel, Hanser Publishers. In some embodiments mixtures of stabilizer additives are particularly effective, especially mixtures of the abovementioned stabilizer additives.

The amount of any stabilizer additive employed is in one embodiment in a range between about 0.0005 wt. % and 10 wt. %, in another embodiment in a range between about 0.001 wt. % and about 10 wt. %, in another embodiment in a range between about 0.04 wt. % and about 8 wt. %, in another embodiment in a range between about 0.1 wt. % and about 6 wt. %, in another embodiment in a range between about 0.2 wt. % and about 5 wt. %, in another embodiment in a range between about 0.5 wt. % and about 5 wt. %, and in still another embodiment in a range between about 1 wt. % and about 5 wt. % based on the weight of resorcinol arylate polymer in a coating layer. A stabilizer additive may be combined with coating layer using known methods. In one embodiment stabilizer additive is at least partially dissolved in a solution with components of a coating layer, and a film of coating layer comprising stabilizer additive is solvent cast. In another embodiment stabilizer additive is at least partially dissolved in a solution and impregnated from said solution into solid or at least partially solid coating layer. In still another embodiment stabilizer additive is combined with coating layer in a melt method such as co-extrusion. If desired, the stabilizer additive may be combined with coating layer in the form of a solution of stabilizer additive, for example in water or organic solvent. In one embodiment an aqueous solution of phosphorous acid is employed as stabilizer additive.

The articles of this invention are prepared in the melt, as described hereinafter. As a result, they are substantially free from volatile organic compounds such as solvents, the term "volatile" as used herein designating materials having a vapor pressure at 25° C. greater than 0.5 kPa. This is especially true of the coating layer, any intermediate layer and the 25 microns of the substrate layer adjoining the next layer; i.e., nearest the coating irrespective of whether an intermediate layer is present. By "substantially free" from such compounds is meant a concentration of such compounds no greater than 100 ppm by weight. Similar articles prepared using solution methods typically have residual solvent concentrations in the same region as high as 0.4%, i.e., 4,000 ppm.

In the method of the invention, a coating layer is applied to a layer, which may be either the substrate layer as defined hereinabove or an intermediate layer, comprising a second material. The second material may generally comprise any of those suitable for use as the first material, as defined hereinabove for the substrate, or those suitable for use as the coating layer and may further contain fillers and colorants such as those described hereinabove. When necessary, it may be specifically chosen so as to provide good adhesion between substrate and coating layers. Colorants of the previously described types may also be present in the coating layer.

Application of the coating layer is performed in the melt, so as to avoid solvent-related problems of the type previously mentioned. Suitable methods for application include fabrication of a separate sheet thereof followed by application to the layer of second material as well as simultaneous production of both layers. Thus, there may be employed such illustrative methods as molding, compression molding, thermoforming, co-injection molding, coextrusion, overmolding, multi-shot injection molding, sheet molding and placement of a film of the coating layer material on the surface of the second layer followed by adhesion of the two layers, typically in an injection molding apparatus; e.g., in-mold decoration. These operations may be conducted under art-recognized conditions.

It is also within the scope of the invention to apply in the melt a structure comprising the coating layer and an intermediate layer of second material, the latter being in this case a thermoplastic resin, to a substrate layer, which is generally of the aforementioned first material. This may be achieved, for example, by charging an injection mold with the structure comprising the coating layer and the layer of second material and injecting the substrate behind it. By this method, in-mold decoration and the like are possible. In one embodiment both sides of the substrate layer may receive the other layers, while in another embodiment they are applied to only one side of the substrate layer.

The thicknesses of the various resin layers in resinous articles of this invention are most often as follows:

substrate—at least about 125$\mu$ (microns), preferably at least about 250$\mu$, more preferably at least about 400$\mu$,
coating—about 2–2,500, preferably about 10–250 and most preferably about 50–175$\mu$,
second material, if any—about 2–2,500, preferably about 10–250, and most preferably about 50–175$\mu$,
total—at least about 125$\mu$, preferably at least about 250$\mu$, more preferably at least about 400$\mu$.

The articles of this invention are characterized by the usual beneficial properties of the substrate layer, in addition to weatherability as evidenced by improved resistance to ultraviolet radiation and maintenance of gloss, solvent resistance and recycling capability by regrind and the like. The latter makes it possible to employ the regrind material as a substrate for further production of articles of the invention.

Multilayer articles of the invention particularly include articles which will be exposed to UV-light, whether natural or artificial, during their lifetimes, and most particularly outdoor articles; i.e., those intended for outdoor use. Suitable articles are exemplified by aircraft, automotive, truck, military vehicle (including automotive, aircraft, and waterborne vehicles), scooter, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; counter tops; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; phone bezels; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

The invention is illustrated by the following non-limiting examples.

EXAMPLE 1

Films of poly(resorcinol isophthalate/terephthalate) (1:1 molar ratio of isophthalate to terephthalate), about 40 microns ($\mu$) thick, were deposited on glass plates by dissolving 10 grams (g) of the polyester in 40 milliliters (ml) of chloroform, drawing onto the plate using a 305-micron doctor blade and drying in air. The films were applied to the surfaces of samples of various colors of a bisphenol A polycarbonate-PBT blend commercially available from General Electric Plastics under the trade designation XENOY 1731, and the resulting structures were heated in a Carver press at about 184–198° C. for 2 minutes, at a pressure of 1.8 metric tons, producing multilayer articles with good adhesion between the layers.

The samples were exposed to weathering in an Atlas Ci35a xenon arc weatherometer equipped with borosilicate inner and outer filters at an irradiance of 0.77 W/m$^2$ at 340 nm. The temperatures were: black panel 70° C., dry bulb 45° C., wet bulb depression 10° C. The cycle was 160 minutes (min) light followed by 5 min dark and 15 min dark with water spray. Samples were evaluated for color on a MacBeth ColorEye 7000A colorimeter with results reported as $\Delta E^*$ ($\Delta E = (\Delta L^2 + \Delta a^2 + \Delta b^2)^{0.5}$). Gloss (60°) was measured on a Byk Gardner Micro Trigloss gloss meter. Results of the weathering experiments after 650 kJ/m$^2$ of exposure are shown in Table 1, in comparison with controls employing the uncoated bisphenol A polycarbonate-PBT blends.

TABLE 1

| | | Examples | | | Controls | | Final |
|---|---|---|---|---|---|---|---|
| Entry | Color | $\Delta E^*$ | Initial gloss, % | Final gloss, % | $\Delta E^*$ | Initial gloss, % | gloss, % |
| 1 | Gray | 2.2 | 100 | 97 | 2.1 | 83 | 7 |
| 2 | Green | 0.6 | 100 | 102 | 2.9 | 65 | 26 |
| 3 | Blue | 2.9 | 97 | 101 | 3.4 | 89 | 24 |
| 4 | Yellow | 1.4 | 99 | 103 | 4.2 | 97 | 49 |
| 5 | Light gray | 5.6 | 108 | 101 | 5.9 | 100 | 46 |
| 6 | Red | 0.9 | 95 | 99 | 5.9 | 100 | 46 |
| 7 | Black | 0.4 | 103 | 101 | 4.9 | 98 | 21 |

It is apparent that the articles of the invention have substantially increased gloss ratings than the corresponding controls, both before and after weathering. Color shifts, ΔE*, were decreased in each case except for the gray article, for which the example and the control had essentially the same values.

EXAMPLE 2

A series of articles with comparable layer thicknesses was prepared as described in Example 1, in which the substrates were commercially available clear and white-pigmented bisphenol A polycarbonates, designated "PCC" and "PCW", respectively; the polycarbonate-polyester blends of Example 1, colored black and designated "PC-PE"; white ABS copolymers, designated "ABS"; and bisphenol A polycarbonate-ABS copolymer blends, colored white and designated "PC-ABS", all commercially available from General Electric Plastics. As coating layers, there were used block copolyester-carbonates containing bisphenol A carbonate units and resorcinol iso/terephthalate units similar to those of Example 1, said block copolyestercarbonates containing 50% and 80% polyester moieties, designated "PEC-50" and "PEC-80", respectively. There was good adhesion between the layers in each The articles were evaluated for gloss as described in Example 1, except that the second series of gloss readings was taken after an exposure of 6035 kJ/m². The results are given in Table 2, in comparison with four controls in which no coating layer was present.

TABLE 2

| Entry | Substrate | Coating | Initial gloss, % | Final gloss, % |
|---|---|---|---|---|
| 8 | PCC | PEC-80 | 119 | 127 |
| 9 | PCC | PEC-50 | 119 | 125 |
| Control 1 | PCC | — | 152 | 110 |
| 10 | PCW | PEC-80 | 105 | 107 |
| 11 | PCW | PEC-50 | 98 | 102 |
| Control 2 | PCW | — | 102 | 4* |
| 12 | ABS | PEC-80 | 109 | 110 |
| 13 | PC-ABS | PEC-50 | 106 | 113 |
| Control 3 | PC-ABS | — | 96 | 2* |
| 14 | PC-PE | PEC-80 | 105 | 110 |
| 15 | PC-PE | PEC-50 | 104 | 105 |
| Control 4 | PC-PE | — | 100 | 20** |

*At 1048 kJ/m².
**At 560 kJ/m².

By comparison of Entries 8–9 with Control 1, Entries 10–11 with Control 2, of Entry 13 with Control 3 and of Entries 14–15 with Control 4, it will be seen that the articles of the invention retained gloss in excellent fashion, while the controls could not even survive the length of the test. Although no control is provided for entry 12, the decrease in gloss for uncoated, white pigmented ABS is very rapid and demonstrates a serious lack of weatherability.

EXAMPLE 3

A series of articles was prepared by the method of Example 1, using as second layers commercially available clear and pigmented sheets of commercially available bisphenol A polycarbonates having thicknesses of about 250μ, the pigments employed being titanium dioxide, carbon black and a yellow pigment package, and as the coating layer the arylate polymers of Examples 1–2 ("PE" and "PEC-50", respectively). The multilayer intermediate articles thus prepared were placed in an injection mold cavity and various bisphenol A polycarbonate-containing resins designated as in Example 2 were injected behind them at an injection temperature in the range of 270–290° C. and molded at an injection boost pressure of 8274 kPa and an injection hold pressure of 6895 kPa, a hold time of 6 seconds (sec) and a cooling time of 20 sec to produce multilayer in-mold decorated articles, whereupon the second layer became an intermediate layer between the substrate and coating layer. The articles were evaluated for gloss according to Example 1.

The results, after an exposure of 1786 kJ, are given in Table 3, in comparison with five controls. Also evaluated were a number of articles having no second layer.

TABLE 3

| Entry | Substrate | Intermediate layer color | Coating layer (μ) | Initial gloss, % | Final gloss, % |
|---|---|---|---|---|---|
| 16 | PCC | Black | PE (40) | 104 | 111 |
| 17 | PCC | White | PE (40) | 107 | 115 |
| 18 | PCC | — | PEC-50 (80) | 148 | 147 |
| Control 4 | PCC | — | — | 144 | 127 |
| 19 | PCW | Clear | PE (40) | 105 | 112 |
| 20 | PCW | Yellow | PE (40) | 108 | 113 |
| 21 | PCW | Black | PE (40) | 104 | 114 |
| 22 | PCW | — | PEC-50 (80) | 109 | 110 |
| Control 5 | PCW | — | — | 105 | 2 |
| 23 | PC-PE | Black | PE (40) | 103 | 111 |
| Control 6 | PC-PE | Black | — | 30 | 2 |
| 24 | PC-PE | White | PE (40) | 108 | 113 |
| Control 7 | PC-PE | White | — | 102 | 3 |
| 25 | PC-PE | White | PE (40) | 108 | 114 |
| Control 8 | PC-PB | — | — | 104 | 3 |

A comparison of the corresponding control with the entries in each data set demonstrates the improved gloss retention of the articles of the invention, whether or not they contained a second layer.

EXAMPLE 4

Multilayer articles similar to those of Examples 1–3, as well as single layers of polycarbonate and polyester-polycarbonate blend, were tested for solvent resistance by applying two drops of toluene, allowing the toluene to remain on the surface for 2 minutes, wiping with a cotton swab at 1 and 2 minutes and inspecting for damage, Dissolution of the surface with total loss of gloss, combined with residue on the swab, was considered severe damage, loss of gloss with no apparent dissolution of the surface or appearance of residue was considered moderate damage, and the appearance of some cloudiness on the surface was considered light damage.

It was found that polycarbonate and polyester-polycarbonate blend were severely damaged after 1 minute. PEC-50 was slightly damaged after 1 minute and moderately damaged after 2 minutes. PE sustained no visible damage after 2 minutes.

EXAMPLE 5

The in-mold decorated articles of Example 3 are capable of processing by regrinding and injection molding, producing compatible resinous articles of excellent morphology and physical properties, the latter including high impact strength.

EXAMPLE 6

A film of the arylate polymer of Example 1, 30.5 cm wide and 254μ thick, was prepared by extrusion and placed on top of a film of commercially available bisphenol A polycarbonate, 101.6 cm square and 254μ thick. The stacked films were heated in a hydraulic press at 200°/atmospheric pressure, 31,028 kPa and 44,818 kPa for one minute each, forming a well adhered laminate. Analysis for residual solvent by thermal desorption gas chromatography-mass spectroscopy showed a residual chloroform level (from processing of the polycarbonate) less than 0.1 ppm by weight.

In a control experiment, a solution of 2 g of the arylate polymer in 18 ml of chloroform was applied to a 254-μ sheet of the same polycarbonate with a doctor blade and the solvent was evaporated, providing a coating with a thickness of 12.7μ. The coated sheet was allowed to air dry overnight, yielding an article of excellent surface appearance. This article was placed in a programmed forced air oven and the temperature was raised from 35° to 125° C. over 16 hours, at a constant rate of 10°/min, held at 125° for one hour and cooled to room temperature. The surface of the article was severely blistered. Analysis by the same method showed the presence of chloroform in a concentration of 0.4% (4,000 ppm) by weight.

EXAMPLE 7

An arylate polymer film identical to that of Example 6 was placed in the cavity of an injection mold and molded into a multilayer article with a bisphenol A polycarbonate-PBT blend commercially available from General Electric Plastics under the trade designation XENOY 1732. The resulting in-mold decorated article was flat and the arylate polymer film was well adhered to the substrate. Upon heating in an oven at 120° C. for 14 hours and 180° C. for 8 hours, the article remained intact and showed no trace of bubbling, cracking or blistering. A control experiment, similar to that of Example 6, provided an article with a blistered surface.

EXAMPLE 8

The procedure of Example 7 was repeated using as the coating layer a block copolyestercarbonate consisting of 50 mole percent bisphenol A carbonate units, 25 mole percent resorcinol isophthalate units and 25 mole percent resorcinol terephthalate units. The result was similar.

EXAMPLES 9–17

In these Examples all the resorcinol arylate polymers comprised structural units derived from resorcinol and a 1:1 mixture of iso- and terephthaloyl dichlorides. The Examples used either a resorcinol arylate polyester (Polymer A) or a resorcinol arylate block copolymer with bisphenol A polycarbonate (Polymer B with about 30 wt. % carbonate units, or Polymer C with about 50 wt. % carbonate units). As stabilizer additives, commercial UV absorbers ("UVA") available from Cytec Corp. were employed: CYASORB 5411 (UVA 1), CYASORB 531 (UVA 2), and CYASORB 1164 (UVA 3). Films were cast from resorcinol arylate-comprising polymer by dissolving 2 grams of the polymer and any auxiliary UV absorber in 8 milliliters of chloroform. The solution was drawn onto a glass plate using 12 mil doctor blade and allowed to dry in air resulting in a film about 40 microns thick. The films were laminated onto injection-molded plaques of LEXAN polycarbonate (from General Electric Plastics) containing 2 wt. % of titanium dioxide pigment under the following conditions to make multilayer articles. Two layers of these films were placed on top of injection molded plaques comprising LEXAN, and the assembly was placed in a Carver press. The sample in the press was heated at about 210° C. with no applied pressure for 2 minutes, under 4500 lbs. gauge pressure for 1 minute, and finally under 6500 lbs. gauge pressure for 1 minute. The films were well adhered to the substrates. The samples were exposed to weathering in an Atlas Ci4000 xenon arc weatherometer equipped with borosilicate inner and outer filters at an irradiance of 0.77 watts per square meter at 340 nanometers. Exposure conditions were black panel 63° C., dry bulb 43° C., humidity 30%, continuous illumination. The cycle was 102 minutes light followed by 18 minutes with water spray. Samples were evaluated for color on a GretagMacbeth™ Color-Eye 7000A colorimeter with results reported as $\Delta E$ ($(\Delta E = \Delta L^2 + \Delta a^2 + \Delta b^2)^{1/2}$) and change in yellowness index ($\Delta YI$; according to ASTM D1925). Exposure was measured in kilojoules per square meter of energy received at 340 nanometers. Results are shown in Table 4. The amount of UVA shown was based on total solids.

TABLE 4

| Example | Polymer | UV Absorber | Initial YI | $\Delta YI$ at 242 $kJ/m^2$ | $\Delta YI$ at 1127 $kJ/m^2$ | $\Delta E$ at 1127 $kJ/m^2$ |
|---|---|---|---|---|---|---|
| 9 | A | none | 5.49 | 11.02 | 12.76 | 10.37 |
| 10 | A | 1% UVA 1 | 6.06 | 8.74 | 10.57 | 8.66 |
| 11 | B | none | 4.63 | 9.43 | 11.62 | 9.26 |
| 12 | B | 1% UVA 1 | 4.91 | 7.53 | 9.89 | 7.92 |
| 13 | B | 5% UVA 1 | 5.77 | 4.52 | 6.92 | 5.61 |
| 14 | B | 1% UVA 2 | 5.48 | 7.21 | 9.68 | 7.65 |
| 15 | B | 1% UVA 3 | 5.52 | 7.52 | 9.84 | 7.92 |
| 16 | C | none | 4.73 | 8.66 | 11.80 | 9.18 |
| 17 | C | 1% UVA 1 | 5.08 | 7.31 | 9.96 | 7.87 |

In each case the use of 1% UVA reduced the amount of yellowing by about 15%, while the use of 5% UVA reduced the amount of yellowing by about 40%.

EXAMPLES 18–25

In these Examples the resorcinol arylate polymer comprised structural units derived from resorcinol and a 1:1 mixture of iso- and terephthaloyl dichlorides. The Examples used a resorcinol arylate block copolymer with bisphenol A polycarbonate containing about 10 wt. % carbonate units. As stabilizer additives, commercial stabilizers were employed, sometimes in combination with phosphorous acid. Phosphorous acid was employed as a 45 wt. % solution in deionized water. Stabilizer additives were mixed with block copolymer before extrusion using a single-screw extruder. The extruded mixture was molded into plaques about one-eight inch thick. The color of the disks was determined and reported as yellowness index (YI; according to ASTM D1925). The results are shown in Table 5. The amounts of stabilizer used are reported in parts based on 100 parts resin (phr).

TABLE 5

| Example | Stabilizer additive (phr) | Initial YI |
|---|---|---|
| 18 | None | 17.2 |
| 19 | Bis(2,4-dicumylphenyl)pentaerythritol diphosphite (0.03) | 12.9 |
| 20 | Bis(2,4-dicumylphenyl)pentaerythritol diphosphite (0.1) | 9.2 |
| 21 | Bis(2,4-dicumylphenyl)pentaerythritol diphosphite (0.1) + deionized water (0.1) | 9.9 |
| 22 | Bis(2,4-dicumylphenyl)pentaerythritol diphosphite (0.05) + phosphorous acid (0.005) | 8.5 |
| 23 | Bis(2,4-dicumylphenyl)pentaerythritol diphosphite (0.1) + phosphorous acid (0.005) | 7.1 |

TABLE 5-continued

| Example | Stabilizer additive (phr) | Initial YI |
|---|---|---|
| 24 | Bis(2,4-dicumylphenyl)pentaerythritol diphosphite (0.15) + phosphorous acid (0.005) | 7.0 |
| 25 | Bis(2,4-dicumylphenyl)pentaerythritol diphosphite (0.1) + phosphorous acid (0.01) | 6.9 |

In each case the addition of phosphite stabilizer alone or in combination with phosphorous acid reduced the initial YI.

EXAMPLE 26

A resorcinol arylate block copolymer with bisphenol A polycarbonate as described in Examples 18–25 was mixed with 0.0005 phr phosphorous acid and 0.1 phr bis(2,4dicumylphenyl)pentaerythritol diphosphite using the method described in Examples 16–25. Molded plaques showed YI of 8.3.

EXAMPLE 27

A resorcinol arylate block copolymer with bisphenol A polycarbonate as described in Examples 18–25 was mixed with 0.005 phr phosphorous acid and 0.1 phr tris(2,4-di-tert-butylphenyl)phosphite using the method described in Examples 18–25. Molded plaques showed YI of 7.4.

EXAMPLE 28

A resorcinol arylate block copolymer with bisphenol A polycarbonate as described in Examples 18–25 was mixed with 0.005 phr phosphorous acid, 0.07 phr tris(2,4-di-tert-butylphenyl)phosphite, and 0.03 phr of a hindered phenol stabilizer using the method described in Examples 18–25. Molded plaques showed YI of 7.7.

EXAMPLE 29

In this Example the resorcinol arylate polymer comprised structural units derived from resorcinol and a 1:1 mixture of iso- and terephthaloyl dichlorides. The Example used a resorcinol arylate block copolymer with bisphenol A polycarbonate containing about 20 wt. % carbonate units. As stabilizer additive, phosphorous acid was employed as 10 wt. % solution in deionized water which was mixed with the block copolymer before extrusion using a twin-screw extruder. The extruded mixture was molded into plaques 2.5 inches square and one-eighth inch thick. The color of the disks was determined on a GretagMacbeth™ Color-Eye 7000A calorimeter and reported as yellowness index (YI; according to ASTM D1925). A plaque containing 0.2 wt. % phosphorous acid had an initial YI of 11.1. For comparison a similar plaque made without phosphorous acid had an initial YI of 20.1.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All

What is claimed is:

1. A multilayer article comprising:
    a substrate layer comprising a first material, a maximum of 75% by weight of said substrate layer, if any, being poly(ethylene terephthalate), and
    a coating layer thereon, said coating layer comprising at least one auxiliary color stabilizer additive and a thermoplastic polyester different from said first material and comprising structural units derived from a 1,3-dihydroxybenzene organodicarboxylate,
    with the proviso that said coating layer and a 25-micron portion of said substrate layer nearest to said coating layer are substantially free from volatile organic compounds.

2. The article according to claim 1 wherein the first material is a metal, ceramic, glass, a cellulosic material, a thermoset resin, or a thermoplastic resin.

3. The article according to claim 2 wherein the first material is a thermoplastic resin.

4. The article according to claim 3 wherein the first material comprises at least one of a homopolymer or copolymer comprising structural units derived from either or both of aliphatic olefins or functionalized olefins; a polycarbonate; a poly(alkylene terephthalate); an addition polymer comprising structural units derived from an alkenylaromatic compound, or blend of a polycarbonate with at least one of a polyester or an addition polymer comprising structural units derived from an alkenylaromatic compound.

5. The article according to claim 4 wherein the first material comprises at least one polyolefin homopolymer, polyethylene, polypropylene, thermoplastic polyolefin, ABS copolymer; ASA copolymer, bisphenol A homo- or copolycarbonate, or poly(butylene terephthalate).

6. The article according to claim 1 wherein the auxiliary color stabilizer additive is at least one member selected from the group consisting of a UV absorber, a hindered phenol, a phosphite, and phosphorous acid, and mixtures thereof.

7. The article according to claim 3 wherein the coating layer comprises structural units of the formula (II):

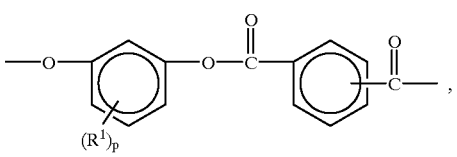

wherein each $R_1$ is halo or $C_{1-12}$ alkyl and p is 0–3, optionally in combination with structural units of the formula (III):

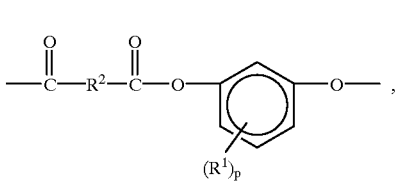

wherein $R^2$ is a divalent $C_{4-12}$ aliphatic, alicyclic or mixed aliphatic-alicyclic radical.

8. The article according to claim 7 wherein the coating layer comprises structural units of formula (II) and p is zero.

9. The article according to claim 7 wherein the coating layer comprises structural units of formulas (II) and (III), p is zero and $R^2$ is a $C_{8-12}$ straight chain aliphatic radical.

10. The article according to claim 7 wherein the coating layer further comprises at least one colorant.

11. The article according to claim 3 wherein the substrate contains at least one of fillers and colorants.

12. A multilayer resinous article comprising:

a substrate layer comprising a first material and a coating layer thereon, said coating layer comprising at least one auxiliary color stabilizer additive and a block copolyestercarbonate comprising structural units derived from a 1,3-dihydroxybenzene organodicarboxylate of the formula (IV):

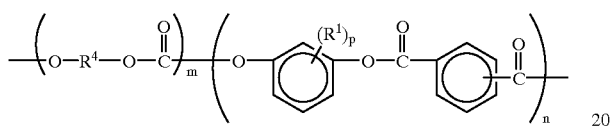

(IV)

wherein each $R^1$ is halo or $C_{1-12}$ alkyl, p is 0–3, each $R^4$ is independently a divalent organic radical, m is at least about 10 and n is at least about 4;

with the proviso that said coating layer and a 25-micron portion of said substrate layer nearest to said coating layer have a concentration of volatile organic compounds no greater than 100 ppm by weight.

13. The article according to claim 12 wherein the first material is selected from the group consisting of metal, ceramic, glass, a cellulosic material, a thermoset resin, and a thermoplastic resin.

14. The article according to claim 13 wherein the first material is a thermoplastic resin.

15. The article according to claim 14 wherein the first material comprises at least one homopolymer or copolymer comprising structural units derived from either or both of aliphatic olefins or functionalized olefins; polycarbonate; poly(alkylene terephthalate); addition polymer of alkenylaromatic compounds, or blend of polycarbonate with at least one of polyesters or addition polymers of alkenylaromatic compounds.

16. The article according to claim 15 wherein the first material comprises at least one polyolefin homopolymer, polyethylene, polypropylene, thermoplastic polyolefin, ABS copolymer; ASA copolymer, bisphenol A homo- or copolycarbonate, or poly(butylene terephthalate).

17. The article according to claim 12 wherein the coating layer comprises structural units of the formula (IV) in which p is zero and $R^4$ is 2,2-bis(p-phenylene)isopropylidene.

18. The article according to claim 12 wherein the auxiliary color stabilizer additive is at least one member selected from the group consisting of a UV absorber, a hindered phenol, a phosphite, and phosphorous acid, and mixtures thereof.

19. The article according to claim 3 further comprising a layer of a second material disposed between said coating and substrate layers.

20. The article according to claim 19 wherein the second material comprises at least one homopolymer or copolymer comprising structural units derived from either or both of aliphatic olefins or functionalized olefins; polycarbonate; polyester; addition polymer of alkenylaromatic compounds, or blend of polycarbonate with at least one of polyesters or addition polymers of alkenylaromatic compounds; and polymers comprising structural units of the formula (II):

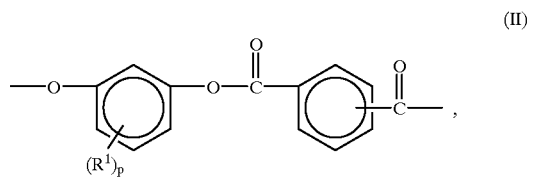

(II)

wherein each $R^1$ is halo or $C_{1-12}$ alkyl and p is 0–3, optionally in combination with structural units of the formula (III):

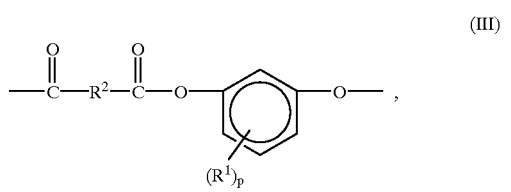

(III)

wherein $R^2$ is a divalent $C_{4-12}$ aliphatic, alicyclic or mixed aliphatic-alicyclic radical.

21. The article according to claim 20 wherein the second material comprises at least one polyolefin homopolymer, polyethylene, polypropylene, thermoplastic polyolefin, ABS copolymer; ASA copolymer, bisphenol A homo- or copolycarbonate, or poly(butylene terephthalate).

22. The article according to claim 12 wherein the coating layer further comprises at least one colorant.

23. The article according to claim 14 wherein the substrate contains at least one of fillers and colorants.

24. The article according to claim 20 wherein the layer of second material contains at least one of fillers and colorants.

25. The article according to claim 2 comprising thicknesses as follows:

substrate—at least about 125μ, coating—about 2–2,500μ, second material, if any—about 2–2,500μ, total—at least about 125μ.

26. The article according to claim 25 comprising thicknesses as follows:

substrate—at least about 250μ, coating—about 10–250μ, second material, if any—about 10–250μ, total—at least about 250° C.

27. The article according to claim 2 which is an outdoor article.

28. A multilayer resinous article comprising:

a substrate layer comprising at least one member selected from the group consisting of homopolymers and copolymers comprising structural units derived from either or both of aliphatic olefins and functionalized olefins; bisphenol A homo- and copolycarbonates; poly (alkylene terephthalates); ABS copolymers; and ASA copolymers; a maximum of 75% by weight of said substrate layer, if any, being poly(ethylene terephthalate), a coating layer thereon, said coating layer comprising at least one auxiliary color stabilizer additive selected from the group consisting of a UV absorber, a hindered phenol, a phosphite, and phosphorous acid, and mixtures thereof; and a thermoplastic arylate polymer different from the polymer of said substrate layer and comprising structural units derived from a 1,3-dihydroxybenzene organodicarboxylate, and optionally
a layer of a second material between said substrate and coating layer, said intermediate layer comprising at least one member selected from the group consisting of homopolymers and copolymers comprising structural units derived from either or both of aliphatic olefins and functionalized olefins; bisphenol A homo- and copolycarbonates; poly(alkylene terephthalates); ABS copolymers; and ASA copolymers; thicknesses being as follows:
substrate—at least about 250µ,
coating—about 10–250µ,
second material, if any—about 10–250µ,
total—at least about 250µ,
with the proviso that said coating layer, second material and a 25-micron portion of said substrate layer nearest to said coating layer have a concentration of volatile organic compounds no greater than 100 ppm by weight.

29. A multilayer resinous article comprising:
a substrate layer comprising at least one homopolymer or copolymer comprising structural units derived from either or both of aliphatic olefins or functionalized olefins; bisphenol A homo- or copolycarbonate, poly(alkylene terephthalate), or ABS or ASA copolymer, a maximum of 75% by weight of said substrate layer, if any, being poly(ethylene terephthalate),
a coating layer thereon, said coating layer comprising at least one auxiliary color stabilizer additive selected from the group consisting of a UV absorber, a hindered phenol, a phosphite, and phosphorous acid, and mixtures thereof;
and a block copolyestercarbonate different from the polymer of said substrate layer and comprising structural units derived from a 1,3-dihydroxybenzene organodicarboxylate of formula (IV)

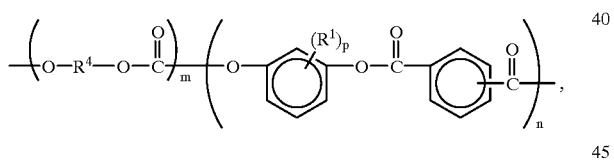

and optionally
a layer of a second material between said substrate and coating layer, said intermediate layer comprising at least one homopolymer or copolymer comprising structural units derived from either or both of aliphatic olefins or functionalized olefins; bisphenol A homo- or copolycarbonate, poly(alkylene terephthalate), ABS copolymer or ASA copolymer;
thicknesses being as follows:
substrate—at least about 250µ,
coating—about 10–250µ,
second material, if any—about 10–250µ,
total—at least about 250µ,
with the proviso that said coating layer, second material and a 25-micron portion of said substrate layer nearest to said coating layer have a concentration of volatile organic compounds no greater than 100 ppm by weight.

30. A multilayer resinous article comprising:
a substrate layer comprising at least one thermostat resin,
a coating layer thereon, said coating layer comprising at least one auxiliary color stabilizer additive selected from the group consisting of a UV absorber, a hindered phenol, a phosphite, and phosphorous acid, and mixtures thereof; and a thermoplastic arylate polymer different from the polymer of said substrate layer and comprising structural units derived from a 1,3-dihydroxybenzene organodicarboxylate, and optionally
a layer of a second material between said substrate and coating layer, said intermediate layer comprising at least one homopolymer or copolymer comprising structural units derived from either or both of aliphatic olefins or functionalized olefins; bisphenol A homo- or copolycarbonate, poly(alkylene terephthalate), ABS copolymer or ASA copolymer;
thicknesses being as follows:
substrate—at least about 250µ,
coating—about 10–250µ,
second material, if any—about 10–250µ,
total—at least about 250µ,
with the proviso that said coating layer, second material and a 25-micron portion of said substrate layer nearest to said coating layer have a concentration of volatile organic compounds no greater than 100 ppm by weight.

31. A multilayer resinous article comprising:
a substrate layer comprising at least one thermoset resin,
a coating layer thereon, said coating layer comprising at least one auxiliary color stabilizer additive selected from the group consisting of a UV absorber, a hindered phenol, a phosphite, and phosphorous acid, and mixtures thereof; and a block copolyestercarbonate different from the polymer of said substrate layer and comprising structural units derived from a 1,3-dihydroxybenzene organodicarboxylate of formula (IV)

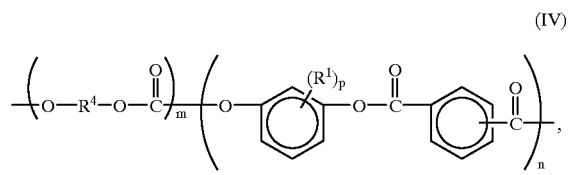

and optionally
a layer of a second material between said substrate and coating layer, said intermediate layer comprising at least one homopolymer or copolymer comprising structural units derived from either or both of aliphatic olefins or functionalized olefins; bisphenol A homo- or copolycarbonate, poly(alkylene terephthalate), ABS copolymer or ASA copolymer;
thicknesses being as follows:
substrate—at least about 250µ,
coating—about 10–250µ,
second material, if any—about 10–250µ,
total—at least about 250µ,
with the proviso that said coating layer, second material and a 25-micron portion of said substrate layer nearest to said coating layer have a concentration of volatile organic compounds no greater than 100 ppm by weight.

32. A method for preparing a multilayer resinous article which comprises applying in the melt a thermoplastic coating layer to a layer comprising a second material, said coating layer comprising at least one auxiliary color stabilizer additive and a polyester comprising structural units derived from a 1,3-dihydroxybenzene organodicarboxylate and a maximum of 75% by weight, if any, of said second material being poly(ethylene terephthalate).

33. The method according to claim 32 wherein the second material is a metal, ceramic, glass, a cellulosic material, a thermoset resin, or a thermoplastic resin.

34. The method according to claim 33 wherein the second material is a thermoplastic resin.

35. The method according to claim 34 wherein the second material comprises at least one homopolymer or copolymer comprising structural units derived from either or both of aliphatic olefins or functionalized olefins; polycarbonate; poly(alkylene terephthalate); addition polymer of alkenylaromatic compounds, or blend of polycarbonate with at least one of polyesters or addition polymers of alkenylaromatic compounds.

36. The method according to claim 35 wherein the second material comprises at least one polyolefin homopolymer, polyethylene, polypropylene, thermoplastic polyolefin, ABS copolymer; ASA copolymer, bisphenol A homo- or copolycarbonate, or poly(butylene terephthalate).

37. The method according to claim 32 wherein the auxiliary color stabilizer additive is at least one member selected from the group consisting of a UV absorber, a hindered phenol, a phosphite, and phosphorous acid, and mixtures thereof.

38. The method according to claim 32 wherein the coating layer comprises structural units of the formula (II): (II):

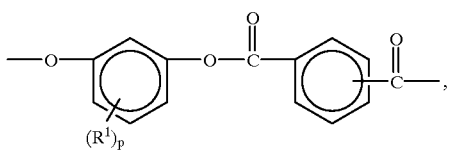

wherein each $R^1$ is halo or $C_{1-12}$ alkyl and p is 0–3, optionally in combination with structural units of the formula (III):

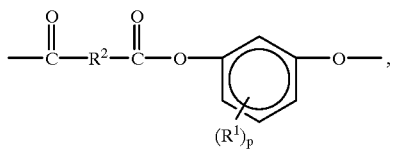

wherein $R^2$ is a divalent $C_{4-12}$ aliphatic, alicyclic or mixed aliphatic-alicyclic radical.

39. The method according to claim 38 wherein the coating layer comprises structural units of formula (II) and p is zero.

40. The method according to claim 39 wherein the coating layer comprises structural units of formulas (II) and (III), p is zero and $R^2$ is a $C_{8-12}$ straight chain aliphatic radical.

41. The method according to claim 34 wherein the layer of second material contains at least one of fillers and colorants.

42. The method according to claim 32 wherein the coating layer further comprises at least one colorant.

43. A method for preparing a multilayer resinous article which comprises applying in the melt a thermoplastic coating layer to a layer comprising a second material, said coating layer comprising at least one auxiliary color stabilizer additive; and a block copolyestercarbonate comprising structural units derived from a 1,3-dihydroxybenzene organodicarboxylate of the formula (IV):

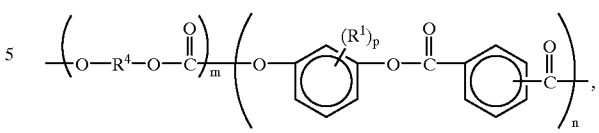

wherein each $R^1$ s halo or $C_{1-12}$ alkyl, p is 0–3, each $R^4$ is independently a divalent organic radical, m is at least about 10 and n is at least about 4.

44. The method according to claim 43 wherein the coating layer comprises structural units of the formula (IV) in which p is zero and $R^4$ is 2,2-bis(p-phenylene)isopropylidene.

45. The method according to claim 43 wherein the second material is a metal, ceramic, glass, a cellulosic material, a thermoset resin, or a thermoplastic resin.

46. The method according to claim 45 wherein the second material is a thermoplastic resin.

47. The method according to claim 46 wherein the second material comprises at least one homopolymer or copolymer comprising structural units derived from either or both of aliphatic olefins or functionalized olefins; polycarbonate; poly(alkylene terephthalate); addition polymer of alkenylaromatic compounds, or blend of polycarbonate with at least one of polyesters or addition polymers of alkenylaromatic compounds.

48. The method according to claim 47 wherein the second material comprises at least one polyolefin homopolymer, polyethylene, polypropylene, thermoplastic polyolefin, ABS copolymer; ASA copolymer, bisphenol A homo- or copolycarbonate, or poly(butylene terephthalate).

49. The method according to claim 43 wherein the auxiliary color stabilizer additive is at least one member selected from the group consisting of a UV absorber, a hindered phenol, a phosphite, and phosphorous acid, and mixtures thereof.

50. The method according to claim 46 wherein said multilayer article is further applied to a substrate layer.

51. The method according to claim 50 wherein the substrate layer comprises at least one homopolymer or copolymer comprising structural units derived from either or both of aliphatic olefins or functionalized olefins; polycarbonate; poly(alkylene terephthalate); addition polymer of alkenylaromatic compounds, or blend of polycarbonate with at least one of polyesters or addition polymers of alkenylaromatic compounds, a maximum of 75% by weight thereof, if any, being poly(alkylene terephthalate).

52. The method according to claim 51 wherein the substrate layer comprises at least one polyolefin homopolymer, polyethylene, polypropylene, thermoplastic polyolefin, ABS copolymer; ASA copolymer, bisphenol A homo- or copolycarbonate, or poly(butylene terephthalate).

53. The method according to claim 50 wherein the substrate layer contains at least one of fillers and colorants.

54. The method according to claim 50 wherein thicknesses are as follows:

substrate—at least about 125µ, coating—about 2–2,500µ, second material, if any—about 2–2,500µ, total—at least about 125µ.

55. The method according to claim 54 wherein thicknesses are as follows:

substrate—at least about 250µ, coating—about 10–250µ, second material, if any—about 10–250μ, total—at least about 250μ.

56. A method for preparing a multilayer resinous article which comprises applying a thermoplastic coating layer to a thermoplastic layer of a second material, said coating layer comprising at least one auxiliary color stabilizer additive selected from the group consisting of a UV absorber, a hindered phenol, a phosphite, and phosphorous acid, and mixtures thereof; and an arylate polymer comprising structural units derived from a resorcinol or alkylresorcinol isophthalate-terephthalate, and said second layer being a sheet comprising at least one of bisphenol A homo- and copolycarbonates, poly(alkylene terephthalates) and ABS and ASA copolymers, a maximum of 75% by weight thereof, if any, being poly(alkylene terephthalate); and optionally applying said multilayer article to a substrate layer comprising at least one homopolymer or copolymer comprising structural units derived from either or both of aliphatic olefins or functionalized olefins; polycarbonate; poly(alkylene terephthalate); addition polymer of alkenylaromatic compounds, or blend of polycarbonate with at least one of polyesters or addition polymers of alkenylaromatic compounds, a maximum of 75% by weight thereof, if any, being poly(alkylene terephthalate), thicknesses being as follows:

substrate—at least about 250μ, coating—about 10–250μ, second material, if any—about 10–250μ, total—at least about 250μ.

57. A method for preparing a multilayer resinous article which comprises applying in the melt a thermoplastic coating layer to a thermoplastic resin layer, said coating layer comprising at least one auxiliary color stabilizer additive selected from the group consisting of a UV absorber, a hindered phenol, a phosphite, and phosphorous acid, and mixtures thereof; and a block copolyestercarbonate comprising structural units derived from a 1,3-dihydroxybenzene organodicarboxylate of the formula (IV):

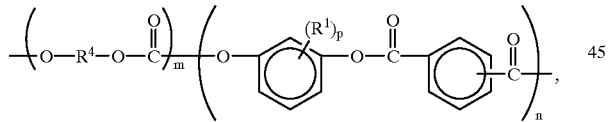

(IV)

wherein p is zero and $R^4$ is 2,2-bis(p-phenylene) isopropylidene, m is at least about 10 and n is at least about 4.

58. A multilayer article prepared by the method of claim 32.

59. A multilayer article prepared by the method of claim 35.

60. A multilayer article prepared by the method of claim 36.

61. A multilayer article prepared by the method of claim 37.

62. A multilayer article prepared by the method of claim 43.

63. A multilayer article prepared by the method of claim 45.

64. A multilayer article prepared by the method of claim 46.

65. A multilayer article prepared by the method of claim 49.

66. A multilayer article prepared by the method of claim 50.

67. A multilayer article prepared by the method of claim 54.

68. The multilayer article of claim 1 which is an aircraft, automotive, truck, military vehicle, military aircraft, military water-borne vehicle, scooter, or motorcycle exterior or interior component, panel, quarter panel, rocker panel, trim, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board;

an enclosure, housing, panel, part, or trim for an outdoor vehicle or device, an electrical or telecommunication device, network interface device, outdoor furniture, aircraft, boat or marine equipment, outboard motor, depth finder, personal water-craft, jet-ski, pool, spa, hot-tub, step, step covering, automatic teller machine (ATM), lawn or garden tractor, lawn mower, tool, sporting equipment, toy, snowmobile, recreational vehicle, golf course marker, or playground equipment;

an enclosure, housing, panel, part, or trim for a computer, desk-top computer, portable computer, lap-top computer, palm-held computer, monitor, printer, keyboard, FAX machine, copier, telephone, mobile phone, phone bezel, radio sender, radio receiver, meter, antenna, light fixture, lighting appliance, transformer, or air conditioner;

an article used in building or construction, glazing, roofing, window, window trim, floor, wall panel, door, door trim, countertop, decorative window furnishing or treatment; a treated glass cover for a picture, painting, poster, or display item; a protected graphic; an outdoor or indoor sign; optical lens; ophthalmic lens; corrective ophthalmic lens; implantable ophthalmic lens; an article made from a plastic-wood combination; a utility pit cover; shoe lace; cladding or seating for public transportation; cladding or seating for trains, subways, or buses; cladding for satellite dishes; coated helmet or personal protective equipment; coated synthetic or natural textiles; coated photographic film or photographic print; coated painted article; coated dyed article; coated fluorescent article; or coated foam article.

69. The article according to claim 1 wherein said coating layer and a 25-micron portion of said substrate layer nearest to said coating layer have a concentration of volatile organic compounds no greater than 100 ppm by weight.

* * * * *